United States Patent [19]
Lewis et al.

[11] Patent Number: 4,917,462
[45] Date of Patent: Apr. 17, 1990

[54] NEAR FIELD SCANNING OPTICAL MICROSCOPY

[75] Inventors: Aaron Lewis; Michael Isaacson, both of Ithaca, N.Y.; R. Eric Betzig, Ann Arbor, Mich.; Alec Harootunian, Syracuse, N.Y.

[73] Assignee: Cornell Research Foundation, Inc., Ithaca, N.Y.

[21] Appl. No.: 394,304

[22] Filed: Aug. 16, 1989

Related U.S. Application Data

[63] Continuation of Ser. No. 207,927, Jun. 15, 1988, abandoned, which is a continuation of Ser. No. 90,408, Aug. 27, 1987, abandoned, which is a continuation of Ser. No. 796,356, Nov. 8, 1985, abandoned.

[51] Int. Cl.$^4$ .................... G02B 5/18; G02B 21/00; H01J 3/14; H01J 5/16
[52] U.S. Cl. .................... 350/319; 250/216; 350/162.11; 350/507
[58] Field of Search ............ 350/1.1, 162.11, 319, 350/507; 250/216

[56] References Cited

U.S. PATENT DOCUMENTS

| | | | |
|---|---|---|---|
| 3,155,505 | 11/1964 | Shannon | 96/27 |
| 3,607,680 | 9/1971 | Uno et al. | 204/24 |
| 3,668,028 | 6/1972 | Short | 156/3 |
| 3,782,823 | 1/1974 | Kantorski et al. | 356/85 |
| 3,852,134 | 12/1974 | Bean | 156/8 |
| 4,030,827 | 6/1977 | Delhaye et al. | 356/75 |
| 4,100,416 | 7/1978 | Hirschfeld | 250/461 B |
| 4,155,801 | 5/1979 | Provancher | 156/630 |
| 4,182,010 | 1/1980 | Lemmond | 29/25.18 |
| 4,195,930 | 4/1980 | Delhaye et al. | 356/301 |
| 4,262,186 | 4/1981 | Provancher | 219/121 LH |
| 4,269,653 | 5/1981 | Wada et al. | 156/644 |
| 4,331,505 | 5/1982 | Hirt | 156/643 |
| 4,511,222 | 4/1985 | Biren | 350/441 |
| 4,604,520 | 8/1986 | Pohl | 250/216 |

FOREIGN PATENT DOCUMENTS

2039031A 7/1980 United Kingdom .

OTHER PUBLICATIONS

Review of Scientific Instruments, 49 (12), pp. 1735–1740, Dec. 1978, "Piezo driven 50 $\mu$m Range Stage with Subnanometer Resolution", by Frederick E. Scire et al.

Ash, A. et al., "Super-Resolution Aperture Scanning Microscop", *Nature*, vol. 237, pp. 510–512, Jun. 30, 1972.

Harootunian, A et al., "ThN6. Near-Field Investigation of Submicrometer Apertures at Optical Wavelengths", *Optical Society of America*, Nov. 1984.

Lewis, A et al., "Near-Field Scanning Optical Microscopy", *Physics Today*, pp. S12–S13, Jan. 1985.

Lewis, A et al., "Scanning Optical Spectral Microscopy with 500Å Spatial Resolution", *Biophysical Journal*, vol. 41, p. 405a, Feb. 1983.

Lewis, A et al., "Development of a 500 Å Spatial Resolution Light Microscope", *Ultramicroscopy*, vol. 13, No. 3, pp. 227–232, 1984.

Moharir, P. S., "Two-Dimensional Encoding Masks for Hadamard Spectrometric Imager", *IEEE Transactions on Electromagnetic Compatibility*, vol. EMC-16, No. 2, pp. 126–129, May 1974.

Pohl, D. W. et al., "Optical Stethoscopy: Image Recording with Resolution /20", *Appl. Phys. Lett.*, pp. 651–653, Apr. 1, 1984, vol. 44, No. 7.

Weisburd, S., "Light Returns with Resolve", *Science News*, vol. 125, pp. 262, 1984.

*Primary Examiner*—Rodney B. Bovernick
*Assistant Examiner*—Ronald M. Kachmarik
*Attorney, Agent, or Firm*—Jones, Tullar & Cooper

[57] ABSTRACT

An aperture probe in the form of a tapered metal-coated glass pipette having a thin tip provides near-field access to a sample for near-field microscopy. The pipette is formed from a glass tube drawn down to a fine tip, and then coated, as by evaporation, by a metallic layer. The central opening of the tube is drawn down to a submicron diameter, and the metal coating is formed with an aperture at that opening. Aperture diameters down to 500 Angstroms diameter are provided. Also disclosed is a microscope utilizing the pipette aperture for scanning near-field imaging of samples.

26 Claims, 3 Drawing Sheets

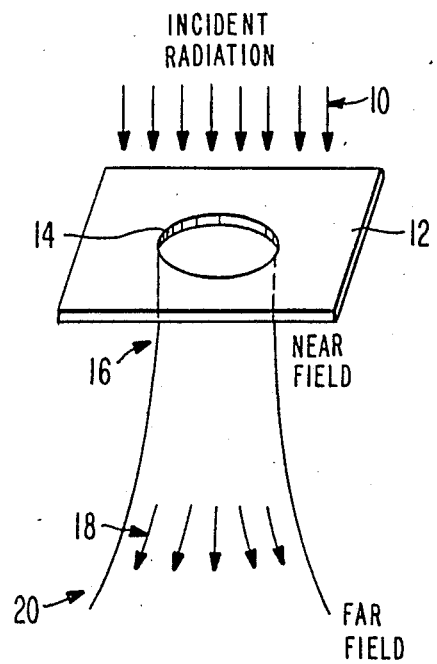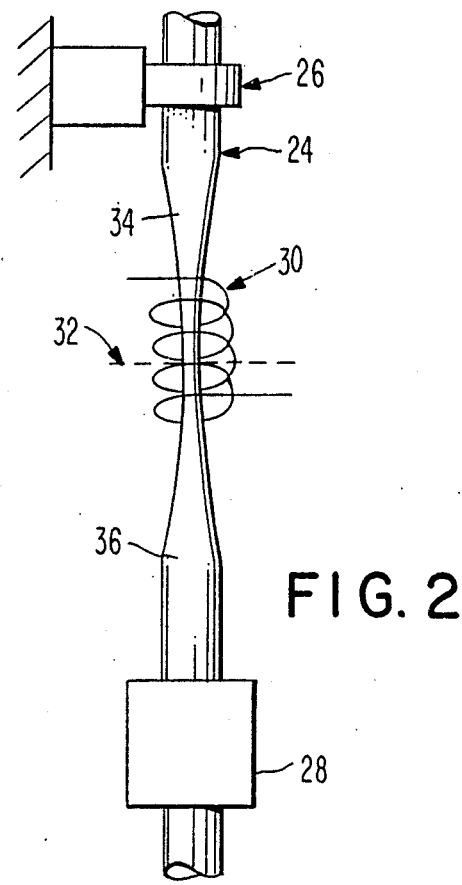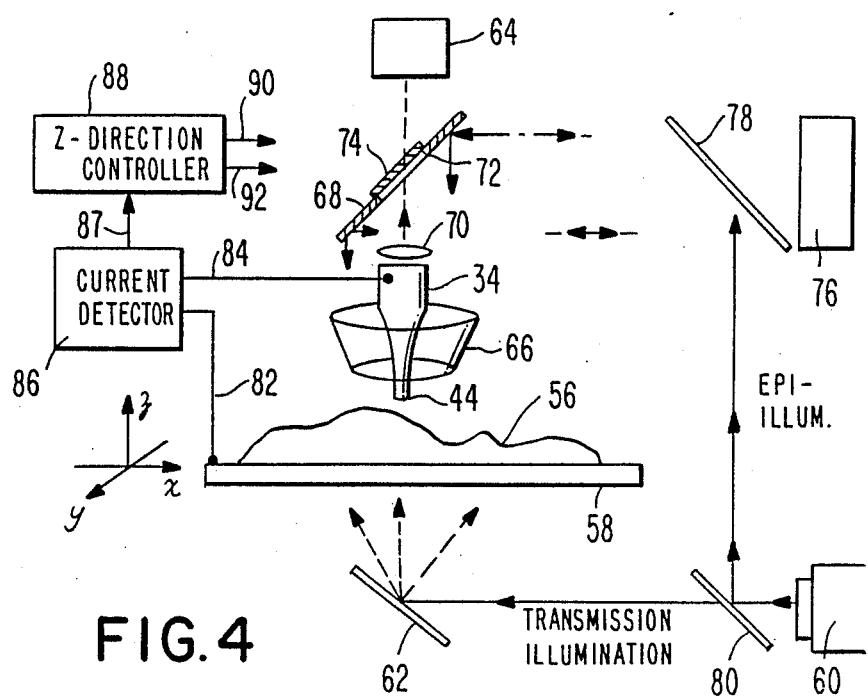

NEAR FIELD SCANNING OPTICAL MICROSCOPY

This invention was made with Government support under AFOSR grand 84-0314 awarded by the U.S. Air Force. The United States Government has certain rights in this invention.

The present invention relates to work supported in part by Grant No. ECS 82-00312 of the National Science Foundation.

This application is a continuation of Ser. No. 07/297,927, filed June 15, 1988, now abandoned, which is a continuation of Ser. No. 090408, filed Aug. 27, 1987, now abandoned, which is a continuation of Ser. No. 796,356, filed Nov. 8, 1985, now abandoned, all entitled "Near - Field Scanning Optical Microscopy" and assigned to the assignee of the present application.

BACKGROUND OF THE INVENTION

The present invention relates to work supported in part by Grant No. ECS 82-00312 of the National Science Foundation.

The present invention relates, in general, to optical microscopy, and more particularly to near-field scanning for high-resolution imaging.

With the advance of submicron technology, the need for a microscope using light for use in the microanalysis of materials has steadily increased. Although various devices, such as electron microscopes, are available for detecting objects with a very high degree of resolution, such prior devices have required that the samples to be observed must be inserted into a vacuum or must be subjected to ionizing radiation. These techniques result in serious damage or destruction of the sample, and, particularly when biological material is being studied, such techniques have been unsatisfactory.

Nondestructive viewing of samples can be obtained with presently available technology, using visible light in two different ranges. At the lower end of the scale, fluorescence spectroscopy, coupled with chemical methods, can be used to determine on a statistical basis the dimensions between objects that are up to about 80 Angstroms apart. At the upper end of the scale, light microscopy, when used in the fluorescence mode, can be used to determine dimensions as small as about one-half the wavelength of the light that is used; that is, down to about 2,500 Angstroms. However, separations between objects, or feature dimensions, of between 80 Angstroms and 2,500 Angstroms are inaccessible when visible wavelengths are used. The ability to determine such dimensions using light microscopy would be very important since, unlike electron microscopy, samples could be studied in their natural environment without resorting to high-vacuum conditions and without the risk of damage. Such actuability would be particularly useful in biological applications where clinical testing or chemical mapping are to be done.

As discussed in copending application Ser. No. 520,041, now U.S. Pat. No. 4,662,747, filed Aug. 3, 1983, and assigned to the assignee of the present application, visible radiation can be transmitted in useful amounts through submicron apertures which are on the order of one-sixteenth of the wavelength of the incident radiation and the radiation emanating through the aperture will be the geometric projection of that aperture. This feature is essentially independent of the wavelength of the incident light. Further, when an aperture is very close to or in contact with an object which is to be imaged, radiation from the object passing through the aperture is the geometric projection of that part of the object which falls within the projection of the aperture. The radiation pattern produced by light passing through a submicron aperture becomes more diffuse as a result of the changing angular distribution of the radiation, which occurs in the Fresnel region. Eventually, a distance is reached where the angular distribution of the radiation pattern becomes constant as a function of distance, so that further motion does not change the shape or size of the pattern. This is known as the far field of the light pattern. Between the aperture and the beginning of the Fresnel region, the radiation is collimated and essentially projecting the shape of the aperture. This region is known as the near-field, and extends for a distance from the surface of the material on which the aperture is formed equal to about one-half the diameter of the aperture.

Over a decade ago, the principle of super-resolution microscopy was demonstrated at microwave frequencies by E. A. Ash and G. Nicholls ("Super-Resolution Aperture Scanning Microscope", Nature 237, p.510, 1972). In their experiment, a grating of 0.5 mm periodicity was imaged with an effective resolution of one-sixtieth the wavelength of the incident radiation. However, until the work described in the above-described copending application Ser. No. 520,041, the applicants therein were unaware of any published attempts to extend this technique to the visible region of the spectrum. Not only did the minute physical dimensions of the optical near-field demand aperture fabrication and micropositioning technologies beyond those available at the time of the Ash, et al, publication, it was also not known whether the results of the microwave experiment could be extended to the visible region. U. C. H. Fischer ("Optical Characteristics of 0.1 um Circular Apertures in a Metal Film as Light Sources for Scanning Ultramicroscopy", J. Vacuum Science Technology, B.3, p.386, 1985) discloses results obtained by scanning a subwavelength aperture over a second, larger aperture. However, the results obtained by that device are difficult to interpret, since the opacity of the metal films used therein was not large, so that the apertures were poorly defined. In addition, coherent monochromatic illumination was used at a grazing incidence, so that a series of standing waves may have been generated to produce the reported results.

A near-field imaging system for use in the far infrared is described by G. A. Massey, et al. ("Subwavelengths Resolution Far-Infrared Microscopy", Applied Optics 24, p.1498, 1985). Although this system may find many applications in the detection of heat transport on a microscopic scale, for example, it does not provide resolution capabilities on a submicron scale. Pohl, et al. ("Optical Stethoscopy: Image Recording With Resolution $\lambda/20$", Applied Physics Letters 44, p.652, 1984), have developed a system for superresolution microscopy, but the sizes and the structure of the apertures used were not characterized. Furthermore, the manufacturing techniques presented in that article present considerable challenges in the attainment of reproducibility.

The foregoing attempts to implement a near-field scanning technique attest to the difficulty of obtaining success. To further demonstrate the technical challenges inherent in this form of microscopy, the transmission of light through a slit of infinite length in a screen of finite thickness was calculated. The results demonstrated that the radiation passing through such an aperture remains collimated to a distance of at least one-half the slit width and that the extent of the near-field increases with the slit width. Further, the calculations indicated that the near-field energy flux exhibited a close-to-exponential decrease in intensity with increasing distance from the screen. These results suggested that rigid stability requirements would be needed in the direction perpendicular to the surface of the object and of the screen in order to obtain reproducible results.

As described in the aforesaid copending application Ser. No. 520,041, an aperture plate incorporating apertures having diameters on the order of 300 Angstroms has been constructed, and it has been demonstrated that visible light can pass through such apertures, independently of the wavelength of the light. Relatively high transmission is obtained, sufficient to obtain detectable amounts of light using an ordinary microscope illuminator lamp as the light source.

Again, as set forth in Ser. No. 520,041, it was found that spectral phenomena, produced by illuminating an object, also exhibit a near-field radiation pattern; that is, spectral phenomena emanating from an object are essentially perpendicular to the surface from which they emanate, within the near-field region of an aperture used to image the surface. This phenomenon, combined with the use of extremely small apertures, permits observation, in the near-field of an object, of a field of view which is limited to the area of the aperture projected on the surface being observed. As long as the surface is within the near-field of the aperture, the spectral phenomena passing through the aperture will be collimated. An image of the object can be formed if the aperture (or an aperture array) is scanned in a raster-like fashion relative to the object. Such a scanning system has a spatial resolution limited by the aperture diameter instead of by the wavelength of incident light or the spectral phenomena emanating from the surface, and thus can have a resolution on the order of one-tenth to one-sixteenth the wavelength of the incident light.

Although the aperture or aperture array of Ser. No. 520,041 works well as described therein, it has been found that some difficulty has been encountered in attempting to obtain precise observations in those cases where the surface of the object is uneven or is shaped in such a way as to prevent the aperture from being positioned so that the object lies in the near-field of the aperture. This condition severely limits the depth of field of the imaging device, and is of particular concern in the study of biological specimens where it may be desirable to view an object having an extremely uneven surface while still avoiding injury to that object.

When viewing objects through extremely small working distances, the positioning of the viewing aperture becomes extremely critical. In such cases it becomes essential that the instrument be isolated from any environmental vibrations, that changes in materials due to thermal drift be prevented or compensated, and that extremely precise positioning of the aperture be available in all three spatial dimensions. Further, since the light transmitted through a submicron aperture is weak, a sensitive detection system is extremely important, and care must be taken to reduce noise.

SUMMARY OF THE INVENTION

It is, therefore, an object of the present invention to provide an improved method and apparatus for carrying out near-field optical microscopy.

It is a further object of the present invention to provide an improved apparatus for near-field microscopy which apparatus is scannable along an irregular surface.

A further object of the present invention is to provide an improved method for constructing an aperture for use in near-field microscopy.

It is a further object of the resent invention to provide apparatus for scanning in high resolution near-field microscopy.

A still further object of the invention is the provision of an improved optical aperture which is capable of scanning an object in the near-field and which is further capable of detecting low-intensity visible light for near-field microscopy.

Another object of the invention is to provide apparatus for mounting and translating an aperture, the apparatus including feedback techniques for positioning the aperture to permit scanning of rough surfaces in the near-field region.

A particular object of the invention is the provision of a high resolution scanning visible light microscope having a resolution comparable to that of a scanning electron microscope, but also having the ability to study live cells and cellular colonies in their living aqueous environment without the need to destroy the biological system by exposing it to ionizing radiation or by putting it in a vacuum.

Briefly, the present invention is directed to an improved aperture probe for placing a scannable aperture in close proximity to the surface of an object to be imaged. The probe is in the form of a highly tapered, metallized glass pipette, with the aperture being formed at the smallest end thereof. The pipette is formed by heating and pulling a glass tube to taper the pipette and then further heating and pulling it until it breaks. By selecting various wall thicknesses of the glass tube, inner tip diameters of from less than 1,000 Angstroms to 5,000 Angstroms, with outer tip diameters of from 5,000 to 7,500 Angstroms have been reproducibly generated, with the thicker-walled tubes producing smaller inner diameters. An aluminum coating is evaporated onto the outer surface of the pipette so formed to increase the opacity of the glass wall. This evaporation results in a uniformly metallized, tapered pipette with a tip aperture smaller than 1,000 Angstroms, and, preferably, about 500 Angstroms.

The taper of the pipette is of particular importance, for when light is passed down the pipette, it is transmitted through the outer glass wall as well as through the central region. The inner diameter of the pipette rapidly tapers from the nominal dimension of the tube body to dimensions of less than an optical wavelength at the tip. Light transmitted through the pipette in the central opening and in the glass wall remains in a propagating mode throughout the length of the pipette since the outer diameter of the glass wall is larger than the cutoff value that would be expected if it were treated as a classical waveguide. Only at the thin metallized region at the tip of the pipette is the cutoff threshold reached, and, accordingly, a large throughput of light is obtained with only a very small region of decay. Upon leaving the aperture, the radiation once again exists in a propagating mode.

The pipette is mounted on a stable platform such as an optical table which isolates it from vibrations which may be present in the building in which it is mounted. The platform preferably is massive and is mounted on vibration-absorbing air mounts to reduce high frequency vertical disturbances. A honeycomb plate resting on pneumatic supports is then placed on top of the optical table to provide isolation in the intermediate frequency range. Mounted on this plate is a housing which surrounds the optical system. Within the housing is a pair of x and y positioning stages which provide coarse positioning for an object or sample to be observed. These stages may be operated by motor-driven threaded actuators for rough positioning of the sample which is to be imaged. Carried on the x and y positioning stages is a piezoelectric high resolution translation stage for very high resolution positioning of the sample. Such high resolution micropositioning stages are well-known, an example of such a stage being described in "Piezo-driven 50 Micrometer Range Stage with Subnanometer Resolution", Frederick E. Scire, et al., Review of Scientific Instruments 49(12), pp.1735–1740, December 1978. A sample holder stage is mounted on the micropositioner stage.

The pipette is positioned with approximately one micron accuracy over the sample holder, and particularly over the section of the sample to be scanned. A positioning stage is provided to located the pipette in the x-y plane. The pipette is also adjustable in the z direction, a stacked piezoelectric element being used for this purpose. Application of a suitable voltage to the stacked piezoelectric element moves the pipette in the z direction toward and away from the surface of the object to be scanned.

A suitable light source is mounted to illuminate the sample, and light detectors are provided in alignment with the upper end of the pipette. The detectors may be in the form of a fiber optic bundle leading to a photomultiplier or other detector circuitry. Incident light is directed onto the sample and is transmitted through, or reflected by the sample, or fluorescence is produced by the sample, in a direction which is perpendicular to the sample surface in the near-field region of the aperture. This light from the sample is detected by the pipette in its near field, and is directed to the detector circuit, which is in the far field of the aperture.

In one embodiment of the invention, light is transmitted down through the pipette and onto the surface of the sample, with returned light in the form of reflection or fluorescence being returned upwardly through the pipette to the detector circuitry. In another embodiment, light is transmitted continuously through the sample, to the pipette.

During the imaging of a surface, the sample (or the pipette) is moved in the x-y plane in discrete steps with respect to the pipette (or the sample), with the steps preferably being about 150 Angstroms in length. Suitable sensors are provided on the pipette probe to detect the distance between the probe tip and the surface of the sample. Feedback signals to the probe positioning stack adjusts the vertical (z-direction) position of the probe during the scan so as to keep the tip in the near-field region.

The pipette aperture probe and positioning apparatus will provide optical microscopy and dynamic measurements of intermolecular interaction in living systems at a scale that bridges the gap between fluorescence microscopy, with its 2,500 Angstroms resolution, and fluorescence spectroscopy, which allows dimension of less than 80 Angstroms to be measured. The availability of the present probe will generate, at 500 Angstroms resolution, chemically selective images of the molecular constituents of living cells. Furthermore, the present device will permit dynamic measurements at 500 Angstroms resolution and will yield fundamental, new insights in biology and medicine.

BRIEF DESCRIPTION OF THE DRAWINGS

The foregoing and additional objects, features, and advantages of the present invention will become apparent to those of skill in the art from a consideration of the following detailed description of preferred embodiments thereof, taken in conjunction with the accompanying drawings in which:

FIG. 1 is a diagrammatic illustration of the near field region of a submicron aperture;

FIG. 2 is a diagrammatic illustration of the method of making a submicron aperture pipette, in accordance with the present invention;

FIG. 4 is a diagrammatic illustration of a near-field microscope using the submicron aperture pipette of the present invention.

DESCRIPTION OF PREFERRED EMBODIMENTS

Figure 3:
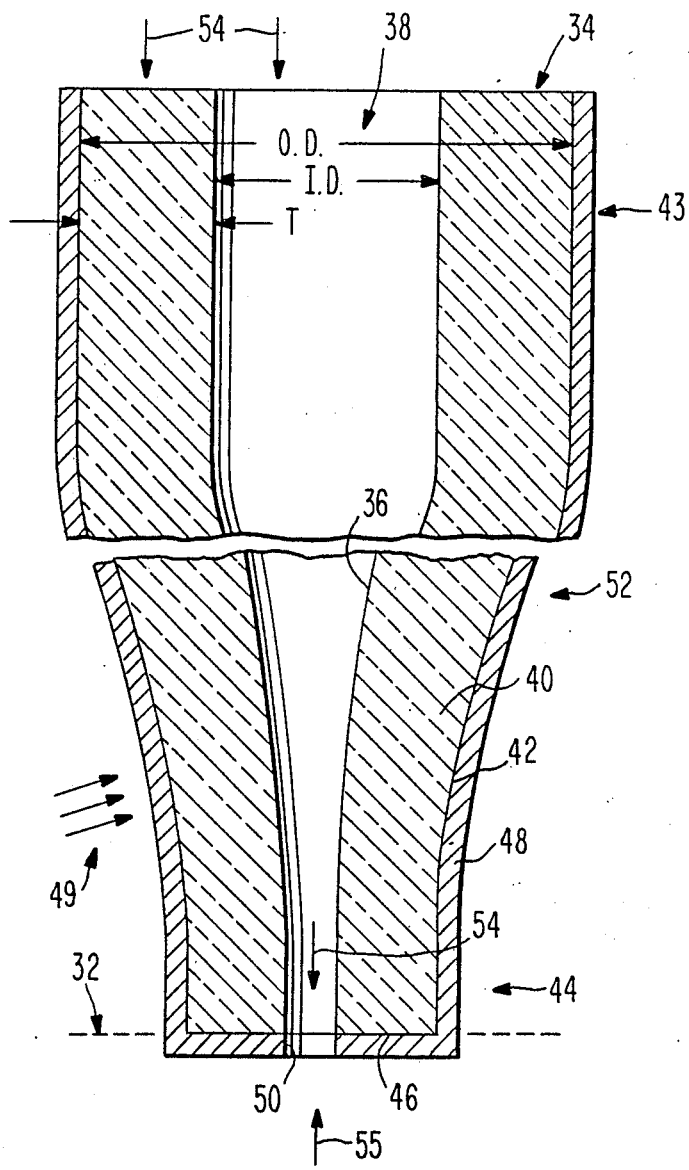
FIG. 3 is an enlarged, partial, cross-sectional view of a pipette in accordance with the present invention.

The fundamental principle underlying the near-field scanning optical microscope of the present invention is illustrated in FIG. 1, where visible light is depicted by arrows 10 as being normally incident upon a conducting screen 12 containing a small aperture 14 having a diameter less than the wavelength of the incident light 10. Because the screen is completely opaque, the radiation emanating through the aperture and into the region beyond the screen is first collimated to the aperture size rather than to the wavelength of the radiation employed. This collimation occurs in the aperture, but continues into the near-field region 16. Eventually, the effect of diffraction is evidenced as a marked divergence in the emanating radiation, indicated by arrows 18, resulting in a radiation pattern that no longer reproduces the geometrical image of the aperture. This occurs in the far field region, generally indicated at 20.

If an object such as a cell membrane is placed within the near-field region relative to aperture 14, the aperture acts as a light source whose size is not determined by the considerations of geometrical optics, but instead is a projected image of the aperture itself. This light source can be scanned over the object, and detected light, either transmitted through the object or reflected therefrom, can be used to generate a high-resolution image of the area on which the light falls. Because the resolution is dependent upon the aperture size rather than upon the wavelength of the incident radiation, it becomes possible to obtain a resolution of 500 Angstroms or better if a sufficiently small aperture is used. This technique can be applied in air, or in aqueous environments, and uses nonionizing, visible radiation, thus allowing functioning biological systems, as well as other objects, to be imaged at high resolution.

Theoretical calculations of the pattern of radiation in the near-field for light transmitted through a slit of infinite length demonstrate that the radiation remains collimated to a distance of at least one-half the slit width, and that its extent increases with slit width. The near-field energy flux calculations showed a close-to-exponential decrease in intensity with increasing distance from the aperture screen. Thus, the radiation emanating from a 500 Angstroms wide slit would remain collimated to an approximate distance of 250 Angstroms. Similar results are obtained with circular apertures. Because the near-field region is so small, it is apparent that an object to be scanned by such an aperture must be positioned very accurately with respect to the aperture. Furthermore, because the intensity in the near-field is so strongly dependent upon distance, the separation between the aperture and the object must be maintained with a high degree of precision. Because of these strict positioning requirements, the use of the present technique in optical imaging devices requires careful attention to the positioning of the object, maintaining its stability, and enhancing the signal to noise ratio for measurements obtained thereby.

In a typical building environment, vibrations exist at frequencies as low as two to four Hz, although most of the vibrational energy is in the five to 30 Hz range. This can translate into displacements of up to one micron, and if this energy were to be transferred without attenuation to the critical components of a near-field scanning optical microscope, and if the aperture and the object were not held together with sufficient rigidity, then their relative displacement could vary by two to three orders of magnitude greater than the precision required to produce meaningful measurements. Accordingly, it is necessary to isolate the optical microscope from both horizontal and vertical vibrations from the building. In addition, such a system must employ a damping mechanism to ensure that any vibrations which are caused by the motion of the object itself in the course of a scan are also reduced or eliminated. Further, the system must be effectively isolated from acoustic vibrations, which fall in the 20 Hz to 20 kHz range.

Although the thermal expansion coefficients of the various components of a near-field scanning optical microscope system will vary widely with composition and size, it can be expected that such components will expand or contract roughly 0.1 to 1.0 microns for every one degree Centigrade increase or decrease in temperature. Thus, the differential rate of expansion of the aperture relative to an object to be imaged presents a serious obstacle toward obtaining the required micropositioning capabilities for superresolution microscopy, unless the instrument is carefully designed to ensure that the thermal expansion of the aperture relative to the object is rather small or that stringent control is maintained over the temperature of the entire apparatus.

A final requirement for accurate micropositioning of the object with respect to the aperture is to translate the aperture and the object accurately with respect to one another in all three spatial dimensions. The translating system should position the aperture with a precision of roughly 20 Angstroms in the z direction (perpendicular to the plane of the object). It is equally necessary to obtain accurate positioning in the x and y directions (in the plane of the object), since the size of the steps taken during scanning the in the x and y directions limits the resolution of such systems. The step size during a scan should be shorter than one-half of the desired resolution, so a system designed for 500 Angstroms resolution must include positioning control of better than 250 Angstroms in the x and y directions.

The light transmitted through a submicron aperture is weak enough to require the use of sensitive detection electronics, and good detection becomes increasingly important when the aperture scans quickly over the object. Weak signals can particularly be expected in biological applications where contrast differences in a specimen can be quite small. In such applications, a variety of nondestructive methods can be used to increase contrast, ranging from a computer enhancement of images to the fluorescent labelling of specimens.

Since rather weak signals are expected, there can be a significant amount of noise. This noise can be reduced by increasing the period of data collection at any given location, but this is done at the expense of scan speed. Noise can also be introduced if there is any variation in the intensity of the light used to illuminate the sample or the aperture. Furthermore, since the aperture screen may not be completely opaque, any light which is transmitted through it, rather than through this aperture, will contribute to noise. There are also sources of noise related to the translation of the object, for variations in the x-y positioning of the object relative to the aperture can cause an apparent distortion in the image or can smear the contrast and resolution information at a selected point. Of even more significance are the large variations in apparent signal strength which can be caused by slight changes in the aperture to object separation. Finally, noise can be introduced when scanning thick, translucent objects (which are thicker than the near-field region of the aperture), because the system will detect light scatter from the diffraction-limited far field regions as well as from the collimated near-field regions.

Although apertures formed in thin, planar membranes of the type illustrated in FIG. 1 could be used in certain imaging applications, as described in the aforesaid copending application Ser. No. 520,041, it has been found that such apertures have a very limited depth of field due to the limited extend of the collimation of radiation in the near-field region. Because of this limitation, apertures in a planar membrane cannot probe recessed regions in rough surfaces. The present invention overcomes this problem through the provision of a highly tapered, metallized glass pipette which carries at its tip a submicron aperture.

The pipette, and a method of making it to produce the required aperture diameter, are illustrated in FIGS. 2 and 3, to which reference is now made. As shown in FIG. 2, the pipette is formed from a glass tube 24 by means of a simple gravity-driven pipette puller. The puller includes a support clamp 26 for securing tube 24 in a vertical position, and a weight 28 secured to the tube below the clamp. Midway between the clamp 26 and weight 28 is an induction heating coil 30 which surrounds the tube and which, upon application of a suitable current, heats the tube to near the melting point. This causes the tube to elongate in the area of the induction coil due to the force applied by the weight 28. By controlling the temperature of the glass, the tube is drawn down until near the breaking point, at which time the tube is cooled and is then broken at the break line, generally indicated at 32, to produce an upper pipette 34 and a lower pipette 44.

As illustrated in FIG. 3, the pulling action produces a highly tapered glass pipette 34 having an inner surface 36 defining an axial, circular central opening 38 and a tapered annular glass wall portion 40 having an outer surface 42. Initially, the tube 24 from which the pipette is formed has an inner diameter (I. D.). The outer diameter (0. D.) of the glass tube 24 depends on the glass thickness selected. As illustrated, the pulling of the pipette causes the outer diameter of the tube to become reduced in size from the nominal outer diameter of the tube 24 which forms the body 43 of the pipette, causes the wall 40 to be drawn down and reduced in thickness T, and causes the central opening 38 to be drawn down to a very small diameter at the tip portion 44 of the pipette. By selecting different wall thicknesses T of the glass tube from which the pipette is formed, the drawing down of the pipettes in the manner illustrated in FIG. 2 produces inner diameters of from less than about 1,000 Angstroms and, preferably, about 500 Angstroms, to about 5,000 Angstroms, with the glass walls of the pipettes having outer diameters at the tip region 44 of between 5,000 Angstroms and 7,500 Angstroms. Thicker-walled tubes were found to produce smaller inner diameters at the tip region.

If desired, the exterior surface of the pipette can be etched with a suitable etchant such as hydrogen fluoride to reduce the outer diameter, whereby a wall thickness of less than 1,000 Angstroms can be produced. This reduces the exterior diameter of the pipette from that which can be obtained simply by pulling the glass tube, and is desirable since the outer diameter of the pipette limits the topography which can be imaged.

The exterior surface 42 of the pipette as well as the lower surface 46 of the pipette tip formed at the break line 32 are coated with a layer 48 of metal, such as aluminum, which is evaporated onto the surface of the pipette in conventional manner, as diagrammatically illustrated by arrows 49. This layer of metal increases the opacity of the glass wall of the pipette to cause the pipette to act as a wave guide for light entering either end thereof, and also forms on lower surface 46 an annular mask having an aperture 50 at the central opening 38 of the tip 44. The mask blocks light propagating in the glass wall, but provides a tip aperture smaller than 1,000 Angstroms. Aluminum is preferred for the layer 48, because of its high absorption coefficient at the wavelengths of visible light. Other metals such as chrome also have desirable properties, such as smaller grain size, but such metals have lower absorption coefficients.

The taper of the pipette in the intermediate region 52 from the body portion 43 to the tip 44 is of particular importance. When light is passed down the pipette in the direction of arrows 54, it is transmitted through the outer glass wall 40, as well as through the central opening 38. The inner diameter of the pipette, that is, the diameter of surface 36, rapidly tapers in the region 52 to a dimension of less than an optical wavelength for the light being used. The light transmission through the glass and through the center of the pipette suggests that the radiation exists in a propagating mode throughout the length of the pipette, since the outer diameter O. D. of the pipette; that is, the diameter of the outer surface 42, can remain larger than the wavelength of the light. However, at the thin, metallized mask region at the tip 46 of the pipette, the cut-off threshold of the propagating light waves is reached; that is, the propagation mode is terminated by the metallized layer at the tip. A decaying evanescent wave is thereby created within the aperture 50 formed in the metallic layer. However, since the metallic layer 48 is thin, the region of evanescence, or decay, is short, and large throughputs of light are observed. Upon leaving the aperture, the radiation once again exists in a propagating mode, but is in the form illustrated in FIG. 1, with the radiation propagating in the near-field in the shape of the aperture 50, and dispersing in the far-field region.

The technique of drawing a pipette down to a small point is an inexpensive and easily reproducible method of fabricating large quantities of apertures having known geometry and hole diameter. By using the proper amount of tension and heat, it is possible to produce pipettes having a tip opening of 500 Angstroms with the interior opening 38 tapering away from the aperture at an angle which permits light to be transmitted either out of the pipette in the direction of arrows 54, or into the pipette in the direction of arrow 55, while experiencing only negligible attenuation. The pipette can, therefore, be used to direct light onto an object very precisely, or can be used to detect light emanating from an object to be studied.

The pipette described with respect to FIGS. 2 and 3 can be used to image an object by using a scanning technique so that spectral phenomena observed in the near-field of the aperture 50 can be recorded at a far field distance. An image of the object can be formed if the aperture is scanned in a raster-like fashion relative to the object and will have a spatial resolution limited by the aperture diameter, rather than the wavelength. Such a scanning optical microscope is illustrated diagrammatically in FIG. 4 wherein a pipette 34 is mounted with its tip 44 adjacent an object 56 to be imaged. The object is carried on a stage 58 which may be transparent, and which is adapted to be moved in very precise steps in x and y directions in the plane of the stage, with, for example, a 20 Angstrom resolution. Light from an intense, tunable light source 60, such as a laser, is directed, in a transmission mode of operation, by means of a mirror 62, through the transparent stage 58 and into the object, or sample 56 to be imaged. The light excites spectral phenomena in the sample, either through fluorescence or transmission. The probe is positioned sufficiently close to the sample that the surface thereof is within the near-field region of the aperture 50 to detect the low-level light signals emitted from the sample. The light collected by the pipette is supplied to a photomultiplier 64, which is in the far field of the aperture on the opposite side thereof from the sample, where the light signals are recorded. Motion of the stage 58 in the x and y directions permits two-dimensional mapping of the sample. Because the light collected is detected in the far field, standard methods for analysis, such as the use of a spectrograph at an optical multichannel analyzer can be used, and a spectral map of the near-field excited region obtained thereby.

Positioning of the pipette with respect to the sample 56 may be accomplished by means of an object lens 66 surrounding the pipette 34, an annular mirror 68 and an eye piece (not shown).

The objective lens 66 has a small diameter central hole in which the pipette 34 can be inserted. The advantage of such a lens arrangement is that the tip 44 of the pipette can be placed at the focal plane of the objective lens so that the lens can be used to obtain an image of the sample over a larger field of view than that obtainable by the pipette to provide coarse positioning of the pipette.

The lens/pipette combination illustrated in FIG. 4 provides a great deal of flexibility in terms of illumination and detection. Thus, the combination can be used not only in the transmission mode discussed above, but also in an epiillumination mode. In the transmission mode, the light transmitted through the sample is collected by the objective lens 66 as well as by the aperture at the tip 44 of the pipette 34. Because of the near exponential decrease in light intensity with distance, the top surface of the sample is imaged preferentially by the pipette, and a lens 70 at the other end of the pipette focuses the radiation through an aperture 72 in the annular mirror 68 and onto the detector 64. A dichroic mirror 74, with filters or a beam-splitter filter combination, may be placed in the aperture 72 if fluorescence is to be detected by detector 64. The annular mirror 68 reflects the light from the far field objective lens 66 onto a second detector 76. A second dichroic mirror 78 can be inserted in the light path before detector 76 if fluorescence light is being imaged by the objective lens 66.

In epiillumination in the fluorescence mode, the same sample and pipette arrangement is used, but the incident light from source 60 is first reflected by a mirror 80 to the dichroic mirror 78 and then by way of dichroic mirror 74 and annular mirror 68 to be focused on the sample 56 by lens 66 and by way of mirror 74 and lens 70 to be directed to the sample through the pipette 34. The detection of fluorescence in this mode is the same as above. Such a design can also be used for nonfluorescence reflectance measurements in epiillumination, and for such measurement, both of the dichroic mirrors 74 and 78 are replaced by beam splitters. For all of these imaging modes, the sample is moved rather than the lens system in order to get the highest resolution.

Since the aperture 50 must be in the near-field relative to the object 56, the aperture-object separation must be determined with great precision, and the pipette tip preferably is used for this purpose. The metal coated tip 44 of the pipette constitutes a small-diameter metal electrode having a radius of about less than one-half micron. By applying a small potential between the pipette and the stage 58 which is electrically conductive, as by way of leads 82 and 84, a measurable current can be determined as by a current detector 86, which will vary with the distance between the surface of the object and the tip of the pipette. This current is a sharp exponential function of the electrode to object separation, and can be used to provide a feedback signal on line 87 to accurately control the vertical position of the pipette through the provision of suitable z-direction positioning transducers (not shown) operated by a controller circuit 88 through lines 90 and 92. Through the use of this feedback loop, the aperture pipette 34 can be moved in the z direction to keep the detected current constant, while simultaneously scanning the object in the x and y directions and recording the measured light signals. In this fashion, a topographic map of the surface being studied can be obtained from a measure of the feedback current, and a chemical map of the object can be obtained from the optical signals.

Alternatively, the position of the pipette in the z direction can be determined and controlled without resorting to the current-detecting method. This alternative method utilizes fluorescent chromophores to uniformly label the sample being measured, which may be a membrane and/or the cytoskeletal proteins in contact with the membrane. In terms of the membrane label, an intermediate chain (C14–C16) fluorescent lipid is used to get a nonspecific, uniform labelling. At room temperature, such a label takes at least 10 minutes to internalize, and if the temperature is somewhat lower than ambient temperature, this time can be considerably extended. With such a label, as a direct analogy to the scanning current method discussed above, the near-exponential change in the near-field fluorescence signal with object to aperture separation can be used to accurately position the aperture in the ear-field relative to the sample.

Because such small positional measurements are involved in the present invention, vibrational and mechanical stability are vital: accordingly, a scanning system which is isolated from vibrations is required. Such a system is illustrated in diagrammatic form in FIG. 5, and includes a mechanism for isolating the microscope from floor vibrations by way of a high-quality optical table, includes eddy current damping, and includes controls for acoustical vibration disturbances. Furthermore, the system reduces ambient temperature fluctuations in the vicinity of the microscope to provide additional stability.

Figure 5:
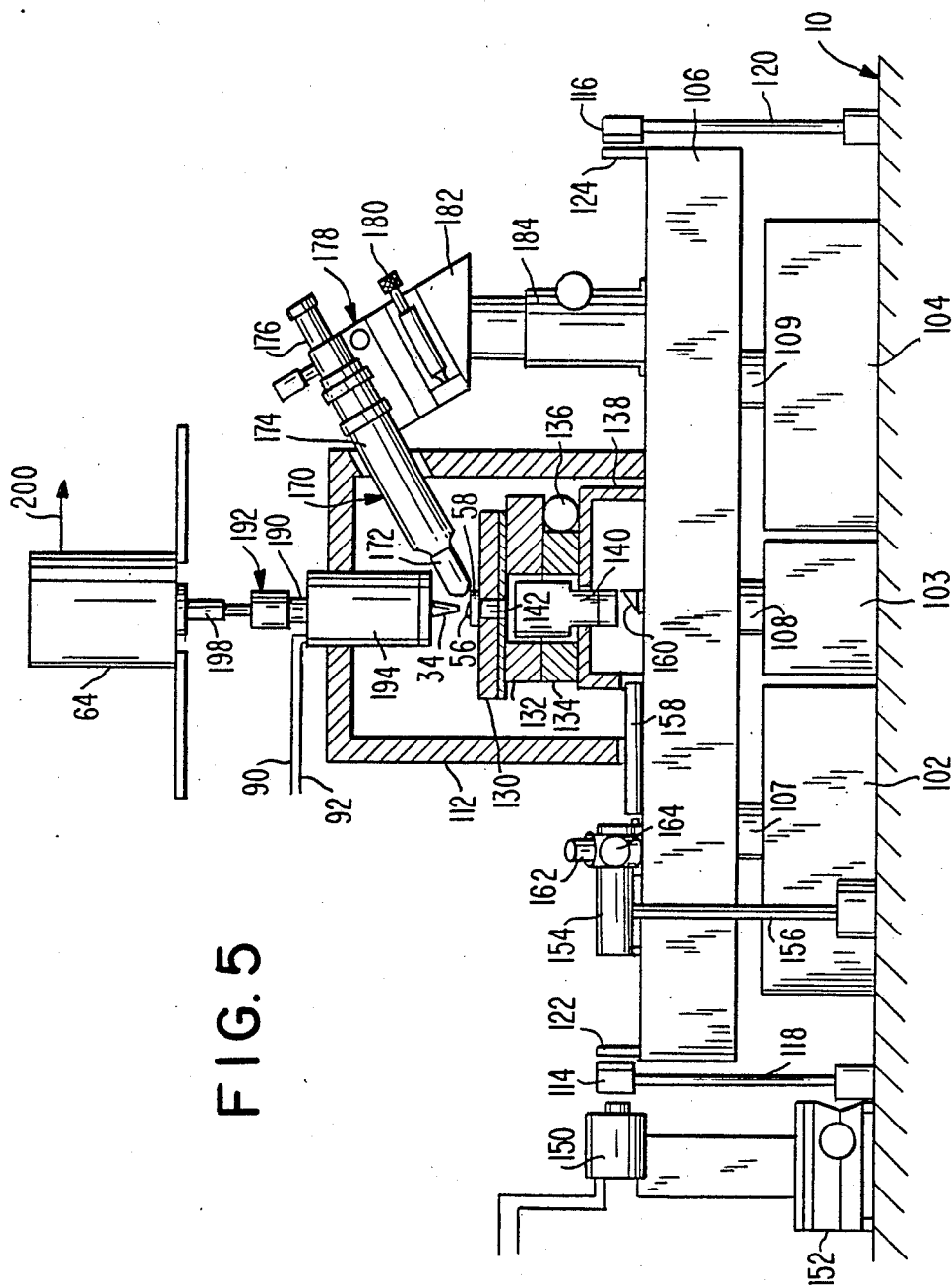
FIG. 5 is a side elevation view, in partial section, of a near-field scanning microscope system.

Turning now to FIG. 5, there is illustrated a mounting system for a pipette 34 which includes an optical table 100 which may be supported on pneumatic supports (not shown) and which carries a plurality of resilient mounts 102, 103, and 104. These resilient mounts also may be pneumatic, and reduce low frequency and high frequency vertical disturbances. An optical board 106 is carried on the resilient mounts 102–104 by means of legs 107–109 to provide damping of vibrations in the intermediate frequency range of 10 to 50 Hz.

Mounted on the top surface of plate 106 is a steel housing, or shell 112, which surrounds the optical microscope to provide additional shielding both for acoustic vibrations and for temperature changes. Mounted at the ends of the plate 106 are a pair of permanent magnets 114 and 116 mounted on corresponding stands 118 and 120 which are supported on the optical table 100. Copper plates 122 and 124 are mounted on the plate 106 adjacent the magnets 114 and 116, respectively, to provide eddy current damping of any motion of the plate 106. An acoustic curtain (not shown) may surround the entire device to shield the microscope from external acoustic vibrations.

An object 56 to be imaged and its mounting stage 58 are carried by an x-y piezoelectric positioning stage 130. This stage is capable of producing motion of the sample 56 in the x and y directions with less than a 0.01 micron resolution. Stage 130 is mounted on an x-direction coarse positioning stage 132 driven by a suitable actuator (not shown). The stage 132 is, in turn, mounted on a y-direction coarse positioning stage 134 which is driven by a motorized actuator 136. Both the x and y direction actuators for stages 132 and 134 have about a 0.1 micron resolution.

The y positioning stage 134 is carried on a base 138 which is, in turn, mounted on plate 106 within the housing 112.

An objective lens 140 may be mounted on a base 138 within openings formed centrally within the x and y positioning stages 132 and 134 to direct light though a central opening 142 in the fine-positioning stage 130. Light is directed through the objective lens 140 from a suitable light source 150, which may be mounted on a precision jack 152 to align the light source with a focusing tube 154 mounted adjacent the plate 106 by means of a support stand 156. The focusing tube 154 directs the light through suitable optics to a light-tight tube 158 which directs the light through the shield 112 and through the base 138 to a mirror 160, and thence through the lens 140 to the sample 56. The optics at the focusing tube 154 may include an eye piece 162 for viewing the sample, as well as a beam splitter 164. The light source 150 may be a laser, or other suitable source such as a Xenon lamp.

For coarse z positioning of the pipette, a microscope 170 having an objective 172, a tube 174, and an eye piece 176 may be mounted on the plate 106 to extend through the housing 112 to the vicinity of the sample 56. The microscope may be mounted on a conventional pitch and yaw stage 178 and may include a focusing micrometer 180 mounted on an angle bracket 182 and a variable height stand 184.

The pipette 34 is, in this embodiment, mounted within the hollow central shaft 190 of a differential micrometer 192 which permits coarse vertical (z-direction) adjustment of the pipette with respect to the surface of sample 56. The micrometer and the pipette are both carried by a conventional piezoelectric expander 194 which is mounted on the housing 112. The expander 194 consists of a stack of piezoelectric devices to which a controlled voltage may be applied by way of leads 90 and 92 from a controller such as that illustrated at 88 in FIG. 4, to move the pipette 34 vertically with a resolution of less than 0.01 micron.

Light collected by the pipette 34 is supplied, in this embodiment, by way of fiber optics 198 to detector 64, which may be a photomultiplier, the output of which is supplied by way of line 200 to suitable amplifier, discriminator, and counting electronics. Because the images are obtained in step-by-step scans, digital techniques can be used for imaging.

Although the invention has been described in terms of preferred embodiments, it will be apparent to those of skill in the art that numerous modifications and variations can be made without departing from the true spirit and scope thereof, as defined in the following claims:

What is claimed is:

1. Apparatus for near-field microscopy, comprising:
   a tapered, generally tubular pipette having an axial central opening, an upper body portion and a lower tip portion, a tapered glass wall coated with an opaque, metallic layer, and a submicron aperture at the end of said tip portion;
   means for mounting said pipette for controlled axial motion, in a z direction;
   stage means for receiving a sample to be observed;
   means for moving said stage means in an x-y plane with respect to said aperture; and
   means for determining the proximity of said aperture to the surface of a sample, and for activating said means for mounting said pipette to move said aperture with respect to a sample to position the surface of the sample within the near-field region of said aperture.

2. The apparatus of claim 12, further including vibration-absorbing means for supporting said stage means and said means for mounting said pipette.

3. The apparatus of claim 2, wherein said vibration-absorbing means includes a support plate carried by pneumatic support means for absorbing vibrations having a frequency above about 5 Hz.

4. The apparatus of claim 12, wherein said means for mounting said pipette includes:
   a housing; and
   positioning means mounted on said housing and supporting said pipette, said positioning means being responsive to control signals for incrementally moving said pipette in said z direction in steps less than the extent of the near-field region of said aperture.

5. The apparatus of claim 4, wherein said positioning means comprises a piezoelectric positioner for moving said aperture in incremental steps of about 20 Angstroms.

6. The apparatus of claim 5, wherein said means for moving said stage means includes a coarse x-y positioner for locating a sample with respect to said aperture, and a fine x-y positioner for incrementally scanning a sample with respect to said aperture.

7. The apparatus of claim 6, wherein said fine x-y positioner includes a piezoelectric positioning means for moving said stage means in incremental steps of about 20 Angstroms in an x direction and a y direction.

8. The apparatus of claim 4, further including optical means for visually monitoring the position of said pipette with respect to a sample.

9. The apparatus of claim 1, further including means for directing intense visible light onto a sample on said stage means, and optical means for visually monitoring the position of said pipette with respect to such a sample.

10. The apparatus of claim 9, wherein said means for directing light onto a sample includes a source of light, an objective lens located to direct light from said source through said stage means and toward said pipette, whereby a sample on said stage means will be illuminated from one side and light emitted from its opposite side will be detected within the near filled region of the surface of the sample by said pipette aperture.

11. The apparatus of claim 10, wherein said means for directing light onto a sample includes a source of light, means for directing light from said source through said pipette and toward the upper surface of said stage means, said pipette collecting reflected light within the near-field region of the surface of a sample on said stage means.

12. The apparatus of claim 1, wherein said means for determining the proximity of said aperture to the surface of a sample on said stage means includes means for applying a voltage between said metallic layer on said pipette and said stage means, and means for measuring the current flow therebetween, the current flow providing a measure of the distance between said aperture and the surface of a sample on said stage means.

13. The apparatus of claim 1, further including means for directing intense, visible light onto a sample carried on said stage means.

14. The apparatus of claim 13, wherein said means for directing light is a laser.

15. The apparatus of claim 13, wherein said means for directing light onto a sample comprises means for directing light through said stage means and toward said pipette for transmission illumination of a sample.

16. The apparatus of claim 13, wherein said means for directing light onto a sample comprises means for directing light through said pipette toward said stage means for epiillumination of a sample.

17. The apparatus of claim 13, wherein said submicron aperture has a diameter less than the wavelength of said visible light.

18. The apparatus of claim 17, wherein said tapered glass wall has at its lower tip portion an outer diameter equal to or greater than the wavelength of said visible light, and an inner diameter less than the wavelength of said visible light, said metallic layer covering the wall of said lower tip portion surrounding said axial central opening of said pipette to provide said submicron aperture, whereby light travelling in said pipette toward said aperture travels in a propagating mode throughout the length of the pipette, travels through said aperture in a decaying mode, and thereafter again travels in a propagating mode, said pipette and aperture producing collimated light in the projected image of said aperture within the near-field region of said aperture.

19. The apparatus of claim 18, wherein said near-field region extends a distance equal to at least one-half the diameter of said submicron aperture.

20. Apparatus for near-field microscopy, comprising:
a pipette having a glass wall forming an upper body portion and a lower elongated tip portion and including an axially extending opening terminating in a submicron aperture at the lower end of said tip portion;
an opaque metallic layer on the outer surface of said glass wall and surrounding said submicron aperture;
means for mounting said pipette for motion with respect to a sample; and
means for moving said pipette to position at least a portion of said sample within the near field region of said aperture.

21. The apparatus of claim 20, further including light source means for illuminating said sample, whereby light from said sample will be detected by said pipette within its near field region.

22. The apparatus of claim 21, wherein said aperture has a diameter less than the wavelength of light from said sample.

23. The apparatus of claim 20, wherein said near field region extends a distance equal to at least one-half the diameter of said submicron aperture.

24. The apparatus of claim 20, wherein said pipette glass wall tapers in thickness from said upper body portion to said tip portion.

25. The apparatus of claim 24, wherein the lower end of said tip portion includes an annular bottom tip wall surrounding said aperture, and wherein the outer surface of said annular tip wall includes said metallic layer.

26. The apparatus of claim 24, wherein the outer diameter of said elongated tip portion is greater than the wavelength of light from said sample, and wherein the diameter of said aperture is smaller than the wavelength of light from said sample.

* * * * *

UNITED STATES PATENT AND TRADEMARK OFFICE
CERTIFICATE OF CORRECTION

PATENT NO. : 4,917,462
DATED : April 17, 1990
INVENTOR(S) : AARON LEWIS et al

It is certified that error appears in the above-identified patent and that said Letters Patent is hereby corrected as shown below:

Column 13, line 51, claim 2, "The apparatus of claim 12," should be --The apparatus of claim 1,--.

Column 14, line 26, claim 10, "filled" should be --field--.

Signed and Sealed this

Twenty-eighth Day of May, 1991

Attest:

HARRY F. MANBECK, JR.

*Attesting Officer*  *Commissioner of Patents and Trademarks*